(12) United States Patent
Ejigu et al.

(10) Patent No.: US 11,447,880 B2
(45) Date of Patent: Sep. 20, 2022

(54) PRODUCTION OF GRAPHENE MATERIALS

(71) Applicant: The University of Manchester, Manchester (GB)

(72) Inventors: Andinet Ejigu, Manchester (GB); Robert A. W. Dryfe, Manchester (GB); Ian A. Kinloch, Manchester (GB)

(73) Assignee: THE UNIVERSITY OF MANCHESTER, Manchester (GB)

( * ) Notice: Subject to any disclaimer, the term of this patent is extended or adjusted under 35 U.S.C. 154(b) by 152 days.

(21) Appl. No.: 16/956,533

(22) PCT Filed: Dec. 21, 2018

(86) PCT No.: PCT/EP2018/086698
§ 371 (c)(1),
(2) Date: Jun. 19, 2020

(87) PCT Pub. No.: WO2019/122379
PCT Pub. Date: Jun. 27, 2019

(65) Prior Publication Data
US 2021/0108317 A1 Apr. 15, 2021

(30) Foreign Application Priority Data
Dec. 22, 2017 (GB) .................................. 1721817

(51) Int. Cl.
*C25B 1/135* (2021.01)
*H01G 11/32* (2013.01)
(Continued)

(52) U.S. Cl.
CPC .............. *C25B 1/135* (2021.01); *C25B 11/04* (2013.01); *H01G 11/24* (2013.01); *H01G 11/32* (2013.01);
(Continued)

(58) Field of Classification Search
None
See application file for complete search history.

(56) References Cited

U.S. PATENT DOCUMENTS 7,071,258 B1 * 7/2006 Jang ...................... C01B 32/225
524/496
10,083,799 B2 * 9/2018 Zhamu ................... H01G 11/36
(Continued)

FOREIGN PATENT DOCUMENTS

WO 2015/158703 A1 10/2015
WO 2015/158711 A1 10/2015
(Continued)

OTHER PUBLICATIONS

Chigane et al., "Manganese Oxide Thin Film Preparation by Potentiostatic Electrolyses and Electrochromism," Journal of The Electrochemical Society, 2000, 147 (6), pp. 2246-2251.
(Continued)

*Primary Examiner* — Dion R. Ferguson
(74) *Attorney, Agent, or Firm* — Hamilton, Brook, Smith & Reynolds, P.C.

(57) ABSTRACT

Methods for the production in an electrochemical cell of metal oxide deposited graphene and/or graphite nanoplatelet structures having a thickness of less than 100 nm, in a cell having a positive electrode which is graphitic and an electrolyte comprising an intercalating anion and a metal cation, wherein the metal is selected from ruthenium, manganese, iridium, tin, and silver. The methods comprising the step of passing a current through the cell to intercalate anions into the graphitic positive electrode so as to exfoliate the graphitic positive electrode and such that the metal ion undergoes electrodeposition in the form of the corresponding metal oxide to produce the metal oxide deposited graphene and/or graphite nanoplatelet structures.

14 Claims, 5 Drawing Sheets

(51) Int. Cl.
| | |
|---|---|
| C25B 11/04 | (2021.01) |
| H01G 11/24 | (2013.01) |
| H01G 11/46 | (2013.01) |
| H01G 11/60 | (2013.01) |
| H01G 11/62 | (2013.01) |

(52) U.S. Cl.
   CPC ............ *H01G 11/46* (2013.01); *H01G 11/60* (2013.01); *H01G 11/62* (2013.01)

(56) References Cited

U.S. PATENT DOCUMENTS

| | | | | |
|---|---|---|---|---|
| 10,903,020 | B2* | 1/2021 | Zhamu | H01G 11/82 |
| 2005/0271574 | A1* | 12/2005 | Jang | C01B 32/22 |
| | | | | 423/448 |
| 2009/0059474 | A1* | 3/2009 | Zhamu | H01G 11/24 |
| | | | | 361/503 |
| 2009/0061312 | A1* | 3/2009 | Zhamu | H01G 11/34 |
| | | | | 429/217 |
| 2011/0157772 | A1* | 6/2011 | Zhamu | H01G 11/24 |
| | | | | 361/502 |
| 2011/0183180 | A1* | 7/2011 | Yu | H01G 11/52 |
| | | | | 429/128 |
| 2014/0107326 | A1* | 4/2014 | Swager | C25B 1/00 |
| | | | | 534/558 |
| 2016/0236939 | A1* | 8/2016 | De Miguel Turullois | |
| | | | | C01B 32/19 |
| 2016/0268061 | A1* | 9/2016 | Wang | C01B 32/186 |
| 2017/0062141 | A1* | 3/2017 | Zhamu | H01G 11/28 |
| 2017/0233255 | A1* | 8/2017 | Zhamu | C25B 1/00 |
| | | | | 205/413 |
| 2018/0190439 | A1* | 7/2018 | Zhamu | H01G 11/26 |
| 2018/0290891 | A1* | 10/2018 | Gong | H01G 11/56 |
| 2018/0330893 | A1* | 11/2018 | Zhamu | H01G 11/26 |
| 2019/0264337 | A1* | 8/2019 | Dryfe | C25B 1/00 |
| 2021/0108317 | A1* | 4/2021 | Ejigu | H01G 11/32 |

FOREIGN PATENT DOCUMENTS

| | | |
|---|---|---|
| WO | 2017/050689 A1 | 3/2017 |
| WO | 2017/060433 A1 | 4/2017 |

OTHER PUBLICATIONS

Cooper et al., "Single stage electrochemical exfoliation method for the production of few-layer graphene via intercalation of tetraalkylammonium cations," Science Direct, 2014, Carbon 66, pp. 340-350.

Dizaji et al., "One-step Electrochemical Synthesis of Graphene/Metal Particle Nanocomposite," Chemistry and Chemical Engineering Research Center of Iran, Tehran, iran, 2016, pp. 1-3.

Nguyen et al., "Electrochemistry of ruthenium dioxide composite electrodes in diethylmethylammonium-triflate protic ionic liquid and its mixtures with acetonitrile," Electrochimica Acta, 2014, 147, pp. 96-103.

Parvez, "Exfoliation of Graphite into Graphene in Aqueous Solutions of Inorganic Salts," Journal of the American Chemical Society, Mar. 31, 2014, 136(16): 6083-6091.

Shen et al., "Carbon encapsulated $RuO_2$ nano-dots anchoring on graphene as an electrode for asymmetric supercapacitors with ultralong cycle life in an ionic liquid electrolyte," Journal of Materials Chemistry A, 2016, 4, pp. 8180-8189.

Stoller et al., "Best practice methods for determining an electrode material's performance for ultracapacitors," Energy and Environ. Sci., 2010, 3 pp. 1294-1301.

Wu et al., "Anchoring Hydrous $RuO_2$ on Graphene Sheets for High-Performance Electrochemical Capacitors," Adv. Funct. Mater., 2010, 20: 3595-3602.

Zhang et al., "Protic Ionic Liquids and Salts as Versatile Carbon Precursors," Journal of The American Chemical Society, 2014, 136: 1690-1693.

International Search Report and Written Opinion for Int'l Application No. PCT/EP2018/086698, titled: Production of Graphene Materials, dated Mar. 25, 2019.

Great Britain Search Report for GB Application No. 1721817.3, titled: Production of Graphene Materials, Date of Search: Jul. 30, 2018.

* cited by examiner

PRODUCTION OF GRAPHENE MATERIALS

This application is the U.S. National Stage of International Application No. PCT/EP2018/086698, filed on Dec. 21, 2018, which designates the U.S., is published in English, and claims priority under 35 U.S.C. § 119 or 365(c) to Great Britain Application No. 1721817.3, filed on Dec. 22, 2017 22. The entire teachings of the above applications are incorporated herein by reference.

FIELD OF THE INVENTION

The present invention relates to metal oxide deposited graphene materials, and use of these materials as electrodes and catalysts. The invention further relates to supercapacitors having an electrode comprising a metal oxide deposited graphene material. The invention further provides a protic ionic liquid and its use in supercapacitors.

BACKGROUND

Graphene was discovered, isolated and characterised in 2004 by Andre Geim and Konstantin Novoselov at the University of Manchester. In its pristine form, graphene is a single layer of carbon atoms arranged in a hexagonal lattice.

Graphene is the strongest material ever tested. It conducts both heat and electricity, and is transparent. Owing to these unusual properties, graphene is incredibly interesting both scientifically and technologically, and graphene and related materials are already finding applications in a wide variety of innovative technologies.

The discovery of graphene gave birth to myriad research programmes investigating ways of making and using graphene, as well as functionalised graphene materials and numerous 2-dimensional heterostructures.

Methods for the production of graphene include both bottom-up and top-down synthetic approaches, with each method having its own benefits and drawbacks. For example, chemical vapour deposition produces relatively high quality graphene but in low quantity, while chemical exfoliation of graphite produces large quantities of near electrically insulating monolayer graphene oxide (GO). Solution exfoliation of graphite produces pristine graphene platelets with yields of typically less than a percent.

The production of graphene via electrochemical exfoliation in aqueous solution is considered very attractive in terms of scalability, reproducibility and affordability, but controlling the quality and properties of the product is often challenging, not least because of the tendency for oxidation of the graphene, especially during anodic exfoliation processes, leading to materials having comparatively low electrical conductivity. This may limit the use of electrochemically exfoliated graphene in electrical applications, such as battery technology.

There is also growing interest in so-called functionalised graphene materials. These are 2D carbon-based materials that include chemical functionality in the form of, for example, substituent groups. These may be inert or reactive, and can be useful for the altering or fine-tuning of the electrical and/or physical properties of graphene to suit applications.

In a conference paper attributed to the 6th International Conference on Nanostructures, Dizaji A K et al. describe an apparent one-step electrochemical method of graphene/copper particle nanocomposite preparation using a graphite rod cathode. The electrolyte contained 1000 ppm CuO and 1000 ppm $NH_4Cl$ in deionized water. The authors note that the mechanism is not understood, but speculate that cations of the electrolyte intercalate between the interlayer space of the graphite cathode, and that reduction of those cations leads to reduction/deposition. The described exfoliation is attributed to internal stress attributed by intercalation.

SUMMARY OF THE INVENTION

The invention relates to metal oxide deposited graphene materials, and use of these materials as electrodes and electrocatalysts. The invention provides straightforward electrochemical methods for the production of these materials by anodic exfoliation of graphite, novel metal oxide-decorated graphene materials, and electrodes and cells comprising such materials. The invention further provides uses of metal oxide deposited graphene materials.

The inventors have found that graphene sheets decorated with certain metal oxides, including mono- and mixed-metal oxides, have desirable electrochemical properties, making them potentially useful in battery technology and catalysis, to name two applications.

Importantly, the methods of the invention provide in situ electrochemical exfoliation and decoration of graphene in a single stage anodic process through inclusion of metal salt in the exfoliation process. Suitable salts include salts which are readily available, inexpensive, and easy to handle. The inventors have found that the resultant products have comparatively low levels of graphene oxide character, which improves properties for many applications, and have surfaces decorated with metal oxide products which alter the electrochemical properties of the products, and in some cases dramatically improve capacitance.

The inventors have shown that controlling the concentration of the salt can be used to control the extent of decoration, which may be useful for tuning the properties of the product.

Using the methods of the invention, the inventors have produced metal oxide decorated sheets having capacitance values significantly higher than those of conventional electrochemically exfoliated graphene.

The present invention relates to a method for the production in an electrochemical cell of metal oxide deposited graphene and/or graphite nanoplatelet structures having a thickness of less than 100 nm, wherein the cell comprises:
(a) a positive electrode which is graphitic;
(b) a negative electrode; and
(c) an electrolyte comprising a metal cation and an intercalating anion;
and wherein the method comprises the step of passing a current through the cell to intercalate anions into the graphitic positive electrode so as to exfoliate the graphitic positive electrode and such that the metal ion undergoes electrodeposition in the form of the corresponding metal oxide to produce the metal oxide deposited graphene and/or graphite nanoplatelet structures.

Suitably, the cation is the cation of a metal, the oxide of which is suitable for use as an electrocatalyst for oxygen evolution. Suitably, the cation is not a cation of a metal selected from cobalt, iron and nickel.

The cation may be the cation of a metal selected from ruthenium, manganese, iridium, vanadium, titanium, tin, and silver.

In a first aspect, the invention may provide a method for the production in an electrochemical cell of metal oxide deposited graphene and/or graphite nanoplatelet structures having a thickness of less than 100 nm, wherein the cell comprises:

(a) a positive electrode which is graphitic;
(b) a negative electrode; and
(c) an electrolyte comprising an intercalating anion and a metal cation, wherein the metal is selected from ruthenium, manganese, iridium, tin, and silver;

and wherein the method comprises the step of passing a current through the cell to intercalate anions into the graphitic positive electrode so as to exfoliate the graphitic positive electrode and such that the metal ion undergoes electrodeposition in the form of the corresponding metal oxide to produce the metal oxide deposited graphene and/or graphite nanoplatelet structures.

Suitably, the negative electrode is also graphitic. For example, it may comprise graphite rod.

Suitably, the electrolyte is an aqueous solution. In other words, suitably the electrolyte is a salt solution in water. The electrolyte comprises a metal cation for electrodeposition onto the nascent graphene surface as the corresponding metal oxide and an intercalating anion for intercalating into the graphitic anode so as to cause exfoliation.

The methods may include the step of isolating the produced graphene and/or graphite nanoplatelets. These may be collected by any suitable process. For example, the electrolyte solution may be filtered to retrieve the product, which may be washed several times with, for example, water. The produce may be re-dispersed for use or further processing, for example in DMF. Sonication may aid re-dispersal.

The Metal Cation

The electrolyte comprises a metal salt. In some cases, more than one salt is used, for example to produce the mixed oxide-decorated products of some embodiments of the present invention. Suitably, the metal salt is dissolved provided as an aqueous solution, which is used as the electrolyte.

The cation component of the salt is electrodeposited on the nascent graphene surface during the electrochemical process, in the form of a metal oxide. A representative reaction is shown below.

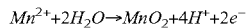

$$Mn^{2+}+2H_2O \rightarrow MnO_2+4H^++2e^-$$

Without wishing to be bound by any particular theory, the inventors speculate that the positive biased voltage at the anode causes oxidation of the metal cation species alongside water oxidation. The higher oxidation state metal cation is thought to react with the water, forming the corresponding metal oxide and electrodepositing onto the nascent graphene layers and or the surface of the electrode. This reaction is thought to prevent or reduce reaction between the reactive products of water oxidation and the graphene or graphite at or in the vicinity of the anode, thereby reducing oxidation of the carbon structure of the product.

In some cases, the electrolyte includes a cation of a metal selected from ruthenium, manganese, iridium, tin, and silver. Oxidation states for stable salts of these metals are known in the art. For example, the electrolyte may include a cation selected from Ru (III), Mn (II), Ir (III), Sn (II) and Ag(I). As described elsewhere, vanadium and titanium may also be used. Oxidation states for stable salts of these metals are known in the art. Examples may be selected from Ti (II), Ti (IV), V (II), V (III), V (IV) and V (V). Suitable counterions will be apparent to the skilled person and include, for example, chloride and nitrate.

In some cases, the electrolyte includes a cation of a metal selected from ruthenium, manganese and iridium; for example Ru (III), Mn (II) or Ir (III). In some cases, the metal is ruthenium. In some cases, the metal is manganese. In some cases, the metal is iridium.

Mixtures of metal cations may also be used, and in some cases may be preferred. The inventors have demonstrated that mixed-oxide products are possible, and in at least some cases have surprising good electronic properties. In some cases, the electrolyte includes at least two cationic species which are cations of metals selected from ruthenium, manganese, iridium, tin, and silver. For example, the electrolyte may include two cations independently selected from Ru (III), Mn (II), Ir (III), Sn (II) and Ag(I). In some cases, the electrolyte includes two cationic species selected from cations of ruthenium, manganese and iridium; for example Ru (III), Mn (II) or Ir (III). In some cases, at least one of the metals is ruthenium. In some cases, at least one of the metals is manganese.

For example, the electrolyte may include a cation of ruthenium and a cation of manganese, for example, Ru (III) and Mn(II).

As described herein, the inventors have observed that the extent of decoration on the graphene surface may be controlled by controlling the concentration of the metal ion(s) to be deposited as metal oxide. Accordingly, it will be appreciated that the concentration of metal ion(s) to be deposited as metal oxide may be varied to suit the desired product of the process.

In some embodiments, the concentration of metal ion(s) to be deposited as metal oxide is between 5 and 50 mM, for example between 5 and 35 mM, for example between 5 and 25 mM, for example between 10 and 25 mM, for example between 15 and 25 mM. In some cases, it is about 7 mM. In some cases, it is about 10 mM. In some cases, it is about 15 mM. In some cases, it is about 20 mM. In some cases, it is higher, for example, about 25 mM or even about 30 mM.

The inventors have found that about 20 mM is an especially usefully concentration. Accordingly, a range of 15 mM to 25 mM may be preferred.

In some cases, more than one metal ion is used to produce a mixed metal oxide structure. For example, ruthenium and manganese may be used as exemplified herein. In those cases, it will be understood that the values in the preceding paragraphs refer to the combined concentration of metal ion(s) to be deposited as metal oxide. Where two metals are used, the ratio may be about 1:1, or the ratio may be varied. For example, in some embodiments, the concentration of ruthenium ions is about 10 mM and the concentration of manganese ions is about 10 mM.

The Intercalating Anion

The electrolyte further comprises anions suitable for intercalating into the graphitic working electrode so as to exfoliate the material. Suitable anions are known in the art and include those referred to in WO 2015/158711[1] which is herein incorporated by reference in its entirety for all purposes. Anions may include and anions derived from sulfonic acid and sulfuric acid, including sulfuric acid monoesters.

In some embodiments, the electrolyte comprises sulfate anions. In other words, the electrolyte may include a sulfate salt.

The anion may be provided in the form of counterion to the cation of the metal species to be deposited as an oxide, or as a separate salt. Providing the intercalating anion as a separate salt permits the concentrations of the metal cation for oxide electrodeposition and the intercalating anion to be independently varied. Suitable counterions include both metal and non-metal counterions. Some are described in Feng et al. [2] the entire contents of which, and in particular the disclosure of the exemplified salt forms, are incorporated by reference. In some cases, the counterion is sodium.

For example, the electrolyte may include a sulfate salt, for example sodium sulfate, and a further metal salt, the sulfate ions acting as an intercalating species during the process.

Suitable concentrations for the intercalating anion may vary with cell set up and operation, and selecting a suitable concentration is within the remit of the skilled person. The concentration may be less than 2.5 M, for example less than 2 M, for example less than 1 M. For example, it may be 0.1 to 2.5 M, 0.1 to 1.5 M or 0.1 to 1 M. In some cases is it 0.1 to 1 M, for example 0.3 to 1 M. In the examples described herein, and accordingly in some embodiments, the concentration is about 0.5 M.

In a further aspect, the invention may provide a composition comprising graphene and/or graphite nanoplatelet structures, wherein said graphene and/or graphite nanoplatelet structures have metal oxide nanostructures deposited on the basal surface.

In some cases, the metal oxide is a mono-metal oxide selected from ruthenium oxide, manganese oxide, iridium oxide, tin oxide, and silver oxide. For example, the metal oxide may be selected from ruthenium oxide, manganese oxide and iridium oxide.

In a further aspect, more than one metal oxide is deposited. This may be referred to as a mixed-metal oxide. The metal oxides may be, independently, any metal oxide as described herein. In some cases, the metal oxides are ruthenium oxide and a manganese oxide (manganese (II, III) oxide).

In some methods and compositions of the present invention, metal oxide deposited graphene and/or graphite nanoplatelet structures having a thickness of less than 100 nm is substantially free of graphene oxide. In other words, as compared to conventional anodic exfoliation methods, the inclusion of the metal leads to exfoliation of a product with reduced graphene oxide character.

The materials may be useful as electrode material in supercapacitor devices.

Accordingly, in a further aspect, the invention may provide a supercapacitor having an electrode comprising a composition as described herein.

In some cases, the electrode comprises metal oxide deposited graphene and/or graphite nanoplatelet structures having a thickness of less than 100 nm, wherein the metal oxide comprises ruthenium oxide.

In some cases, the supercapacitor has an electrolyte comprising diethylmethylammonium bisulfate. This is suitably provided in an organic solvent, for example, in acetonitrile. Suitable concentrations may depend on the set up and/or intended use of the cell. In some cases, the concentration of diethylmethylammonium bisulfate is 0.1 to 1.5 M, for example 0.5 to 1.5 M. It may be about 1 M.

In a further aspect, the invention provides diethylmethylammonium bisulfate, optionally wherein the diethylmethylammonium bisulfate is provided as a solution in an organic solvent, suitably an aprotic solvent such as acetonitrile. In some cases, the concentrations are as described in the preceding paragraph. The invention further provides use of diethylmethylammonium bisulfate in an electrolyte in an electrochemical cell; optionally wherein the electrochemical cell is a supercapacitor.

The invention includes the combination of the aspects and preferred features described except where such a combination is clearly impermissible or expressly avoided.

DEFINITIONS AND FURTHER DETAILS

Graphene

The term graphene is conventionally used in the art to refer to both monolayer graphene, sometimes called pristine graphene, and few layer graphene. In the present application, the term "graphene" is used to describe materials consisting of ideally one to ten graphene layers, preferably where the distribution of the number of layers in the product is controlled.

In some cases, electrochemical methods as described herein usefully produce thicker material (i.e. material having more than 10 carbon layers). The "graphene-like" properties of materials may be a continuum, and products having greater than 10 layers may be produced and have the same or similar properties to graphene having one to ten graphene layers. These materials are referred to herein as graphite nanoplatelets and graphite nanoplatelet structures. In other words, the method may also be used to make graphite nanoplatelet structures under 100 nm in thickness, more preferably under 50 nm in thickness, more preferably under 20 nm in thickness, and more preferably under 10 nm in thickness. The size of the graphene flakes produced can vary from nanometres across to millimetres, depending on the morphology desired.

The corresponding "bulk" material of graphene is graphite. This typically consists of thousands of layers of graphene.

In some embodiments, the material produced is graphene having up to ten layers. The graphene produced may have one, two, three, four, five, six, seven, eight, nine or ten layers. It may be preferred that the material produced is substantially free of graphene oxide. "Substantially free" means less than 10% by weight, preferably less than 5% by weight, more preferably less than 1% by weight of graphene oxide.

Decorated Graphene

The term decorated graphene, and the associated term decorated graphite nanoplatelets, is used herein to described graphene (and/or nanoplatelets) having a metal oxide deposited on the layer surface. The metal oxide is electrodeposited during the electrochemical exfoliation process. It will be appreciated that, except where context clearly dictates otherwise, the term metal oxide refers to both mono-metal oxides and mixed metal oxides.

As described herein, the amount of deposited metal oxide may be controlled by adjusting the concentration of metal ion in the electrolyte. It will be appreciated that the morphology of the deposited metal oxide may vary with the degree of deposition (which may be controlled by the concentration of the metal ion) and the nature of the oxide or metal oxides. Morphologies obtained may include nanoparticles, nanowhiskers, lamellar honeycombs and petal structures. Deposited metal oxide structures may be spread uniformly across the graphene surface, or may be arranged in aggregates on the surface.

In some embodiments, the metal oxide is $MnO_2$ and the deposited structure is a honeycomb lamellar structure. The thickness may be between 1.5 nm and 2.5 nm. In some embodiments, it is about 2 nm.

In some embodiments, the metal oxide is $RuO_2$ and the deposited structure is metal oxide nanoparticles. The average size of the $RuO_2$ nanoparticles may be between 1.5 nm and 2.5 nm. In some embodiments, it is about 2 nm.

In embodiments, the graphene is decorated with combination of $RuO_2$ and manganese oxide, understood to be manganese (II,III) oxide (the combination is referred to herein as a mixed oxide) and the deposited structure is a manganese oxide honeycomb structure with rod and plate-shaped $RuO_2$ nanostructures growing out of the honeycomb structure.

At the priority date, the inventors believed the "mixed oxide" graphene to be decorated with a combination of $RuO_2$ and $MnO_2$. On the basis of further work (as discussed below) it is now understood that the "mixed oxide" graphene is decorated with a combination of $RuO_2$ and $Mn_3O_4$, that is, manganese (II,III) oxide.

Electrode

In the methods of the present invention, a graphitic anode is exfoliated. Accordingly, the methods of the present invention use a positive electrode which is graphitic. In other words, the positive electrode comprises graphite. The graphite may be provided in any suitable form. For example, it may be provided as a rod, as graphite foil, or a powder, which may be provided as a composite in a polymeric support, or in a mesh. In some cases, the positive electrode comprises graphite which has been pre-expanded, although this is not essential. In other words, the positive electrode may comprise graphite having at least some inter-layer distances of greater than 0.335 nm. In some cases, at least 5% of the graphite layers have a greater than 0.335 nm spacing. In some cases, at least 10% of the graphite layers have a greater than 0.335 nm spacing. In some cases, at least 15% of the graphite layers have a greater than 0.335 nm spacing. In some cases, at least 20% of the graphite layers have a greater than 0.335 nm spacing. In some cases, at least 25% of the graphite layers have a greater than 0.335 nm spacing. In some cases, at least 30% of the graphite layers have a greater than 0.335 nm spacing. In some cases, at least 40% of the graphite layers have a greater than 0.335 nm spacing. In some cases, at least 50% of the graphite layers have a greater than 0.335 nm spacing. In some cases, at least 60% of the graphite layers have a greater than 0.335 nm spacing. In some cases, at least 70% of the graphite layers have a greater than 0.335 nm spacing. In some cases, at least 80% of the graphite layers have a greater than 0.335 nm spacing.

Inter-layer distances of more than 0.335 nm may, for example, be greater than 0.35 nm, for example greater than 0.37 nm, for example greater than 0.40 nm, for example greater than 0.45 nm.

Methods to pre-expand graphite are known in the art and include, for example, immersing the graphite in very low temperature liquids (less than −100° C.) followed by a solvent, for example an alcohol such as ethanol. In the examples described herein, the graphite foil working electrode was pre-expanded by immersion in liquid nitrogen for 30 s following by transferring into absolute ethanol.

The cathode (negative electrode) may be graphitic or another material. For example, the negative electrode may be a graphite rod.

A reference electrode may be used.

Exfoliation Cell

The cell contains a graphitic positive electrode for exfoliation, a negative electrode which may be graphitic or another material, and an electrolyte. An H-type electrochemical cell may be used. Suitably, the electrochemical cell is configured to provide separate anode and cathode compartments. For example, the anode and cathode may be separated by a glass frit. Such an electrochemical cell potentially prevents the contamination of the exfoliated graphene samples by metal hydroxides since the hydroxyl ion that continuously generates at the counter electrode (cathode) from reduction of water may react with the metal. It also ensures that any functionalisation of the nascent exfoliated graphene is solely due to the co-deposition of metal oxides at anode rather than due to the physical mixtures from the metal hydroxides generated at cathode.

In summary, the inventors have shown that the use of certain metal cations during electrochemical exfoliation of graphite can be used to produce metal-oxide decorated materials which may be useful for use as electrodes and as electrocatalysts. Advantageously, in some cases, the graphene oxide character of the product is low. A bi-metal oxide decorated graphene product, decorated with a uniformly grown $RuO_2$ and $Mn_3O_4$ (originally thought to be $RuO_2$—$MnO_2$) structure was found to be an efficient electrode for a supercapacitor (500 F g$^{-1}$) and an efficient electrocatalyst for water splitting (1.4 V).

SUMMARY OF THE FIGURES

Embodiments and experiments illustrating the principles of the invention will now be discussed with reference to the accompanying figures in which.

Figure 1:
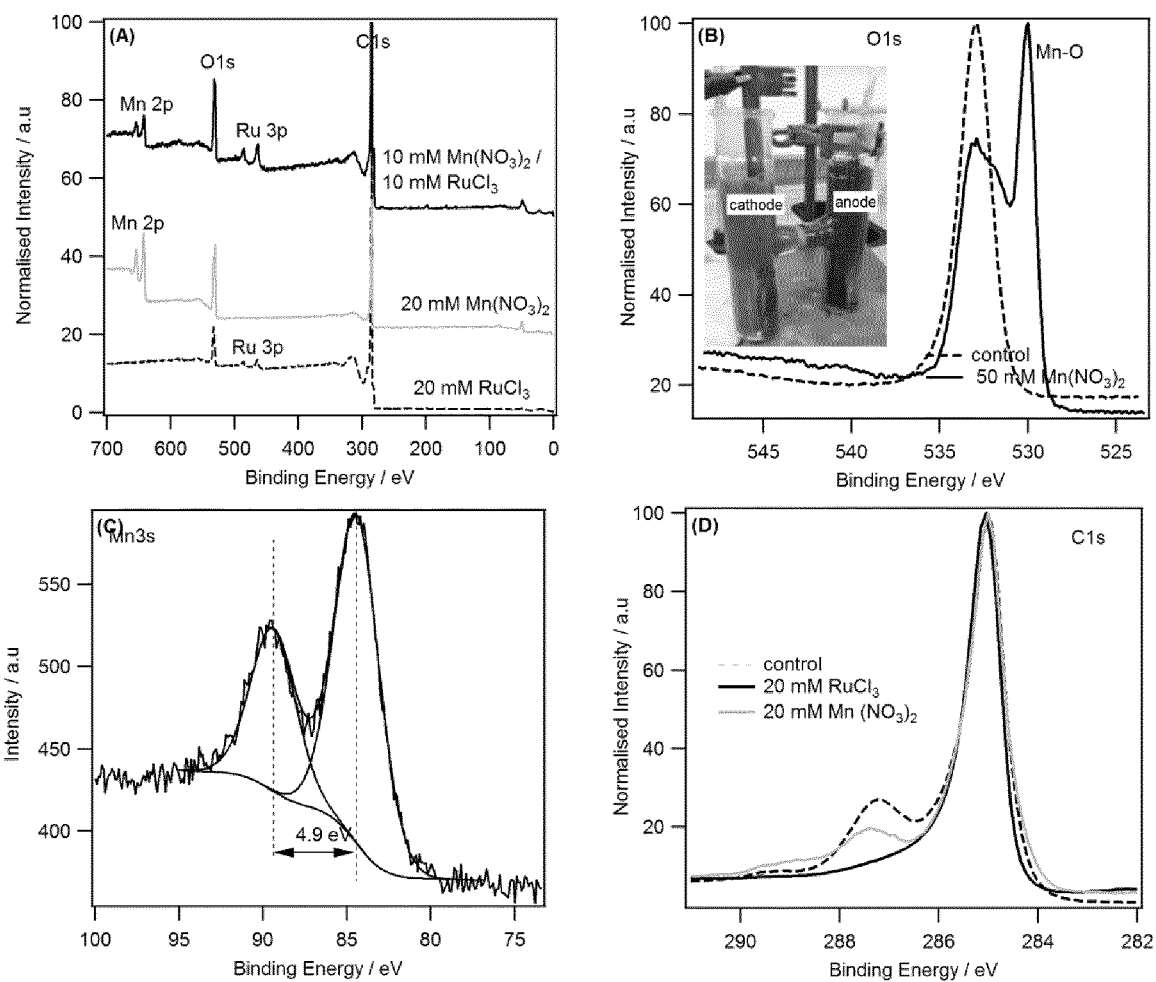
FIG. 1 shows (A) Survey-scan XP spectra obtained for graphene samples that were obtained by electrochemical exfoliation of graphite in 20 mM $RuCl_3$ in 0.5 M $Na_2SO_4$ (aq), 20 mM $Mn(NO_3)_2$ in 0.5 M $Na_2SO_4$(aq) and in a mixture of 10 mM $RuCl_3$ and 10 mM $Mn(NO_3)_2$ in 0.5 M $Na_2SO_4$(aq). (B), (C) and (D) High resolution XP spectra in the O1s, Mn3s and C1s region respectively. All peak positions were charge-corrected by setting the binding energy of the C 1s signal to 285 eV.

Note: At the priority date, the inventors believed the graphene to be functionalised with MnO$_2$—RuO$_2$. However, the inventors have since found that the graphene is functionalised with Mn$_3$O$_4$—RuO$_2$. The figure legends reflect this improved understanding.

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

The inventors have found that the inclusion of certain metal salts in the exfoliation solution during the electrochemical exfoliation of graphene leads to exfoliated graphene sheets decorated with the oxide of that metal. The following examples describe, without limitation, the use of Mn and Ru salts in this process and the respective metal oxide decorated graphene sheet products. The inventors have also observed simultaneous exfoliation and decoration in additional experiments not presently described. These experiments include Ir, Sn and Ag salts, resulting in IrO$_2$, SnO$_2$ and Ag$_2$O decorated products.

This process can also be used to produce mixed-metal oxide decorated graphene sheets. Described below, without limitation, is the production of a bimetal oxide (the example is Mn$_3$O$_4$—RuO$_2$) electrodeposited on conducting graphene support.

The loading of the desired metal oxides (mono- or bi-oxides) can be controlled by varying the concentration of the salt during electrochemical exfoliation.

Advantageously, the product may have lower graphene oxide character than convention anodically produced "graphene" products. For example, the inventors have demonstrated low levels of oxidation when ruthenium or iridium is used. In other words, in some embodiments the invention may provide a method for the production in an electrochemical cell of graphene and/or graphite nanoplatelet structures having a thickness of less than 100 nm, wherein the cell comprises (a) a positive electrode which is graphitic; (b) a negative electrode; and (c) an electrolyte comprising an intercalating anion and a cation of a metal selected from ruthenium and iridium; and wherein the method comprises the step of passing a current through the cell to intercalate anions into the graphitic positive electrode so as to exfoliate the graphitic positive electrode to produce the graphene and/or graphite nanoplatelet structures. As described herein, the product is decorated with metal oxide deposits. Metal oxide nanostructures are deposited on the surface. The product may be used in decorated form as obtained, or further processed.

The materials offer utility in electrochemical applications, for example for use as electrodes or as electrocatalysts. To that end, the inventors made a supercapacitor coin cell, the details of which are described below. The materials may be useful as an electrocatalyst for water splitting.

Materials and Reagents

Anhydrous sodium sulfate, ruthenium (III) chloride (99.9%) and manganese (II) nitrate hydrate (99.9%) were obtained from Sigma-Aldrich. All electrochemical measurements were performed either using an Autolab potentiostat model (PGSTAT302N, Metrohm Autolab, The Netherlands) or power source. Graphite foil (>99%) was obtained from Gee Graphite Ltd (UK). Omnipore membrane filters made of poly(tetrafluoroethylene) (JVWP01300) were used, pore size of 0.1 μm. Ultra-pure water (18.2 MΩ cm resistivity) was obtained from a Milli-Q water purification system.

Characterisation of the Exfoliated Product

Raman spectra were obtained using a Renishaw inVia microscope with a 532 nm excitation laser operated at a power of 3.32 mW with a grating of 1800 lines/mm and 100× objective. The samples for Raman measurement were prepared by drop coating the dispersion (in DMF) onto a Si/SiO$_2$ wafer and then dried on a hot plate at 150° C. to evaporate the solvent. For AFM analysis, the composite (e.g. graphene-MnO$_2$) dispersion was spray-coated onto a Si/SiO$_2$ substrate which was dried in a vacuum oven at 80° C. SEM analysis was carried out using an FEI Quanta 650 FEG environmental scanning electron microscope. (S)TEM was carried out by FEI Talos F200X operated at 200 kV and FEI Titan[3] G2 60-300 operated at 80 kV. A sample for (S)TEM was prepared by dispersing dried composite sample into DMF solution for few sec and then drop casted over TEM grid. The concentration of the graphene dispersion was measured with UV-vis spectroscopy using a model DH-2000-BAL (Ocean Optics). X-ray photoelectron spectroscopy (XPS) was performed using a Kratos Axis Ultra DLD spectrometer with a monochromated Al Kα X-ray source (E=1486.6 eV, 10 mA emission). X-ray Diffraction (XRD) was performed on a Philips X'pert PRO diffractometer with Cu Kα radiation (λ=0.154 nm) operating at 40 kV and 30 mA.

Electrochemical Exfoliation of Graphite in the Presence of Metal Cations

An H-type electrochemical cell consisting of a graphite foil working electrode (pre-expanded by immersing in liquid nitrogen for 30 s followed by transferring into absolute ethanol) in the anode compartment and a graphite rod counter electrode in the cathode compartment was used. The electrochemical cell was separated by porous glass frit and the compartment was separated by 7 cm (inset of FIG. 1B). The electrolyte was prepared by dissolving 0.5 M Na$_2$SO$_4$ in ultra-pure water and various concentrations of Ru (III) salt or Mn (II) salt (7, 20, 30 mM). In some cases, the exfoliation solution contains 10 mM RuCl$_3$ (aq), 10 mM Mn(NO$_3$)$_2$(aq) and 0.5 M Na$_2$SO$_4$ (aq). Electrochemical exfoliation and functionalisation of graphite carried out by applying +20 V to graphite foil (anode compartment) using power source. 20.0 V was the optimum voltage. Below this value the exfoliation yield was lower. The exfoliated product was washed several times with water and then re-dispersed in DMF by sonicating for 20 min.

FIG. 1A shows the survey scan XP spectra obtained for graphene samples exfoliated in the presence of 20 mM Mn(NO$_3$)$_2$, 20 mM RuCl$_3$ or in the mixture of the two salts (10 mM Mn(NO$_3$)$_2$ and 10 mM RuCl$_3$). The presence of either Mn or Ru (or both) signals along with C 1s and O 1s in the wide scan confirms the functionalisation of graphene with their respective metal species. Close inspection of 01s obtained from graphite sample exfoliated in the presence of 20 mM Mn(NO$_3$)$_2$ shows the formation of a new oxygen peak at the characteristic binding energy position of Mn oxide. Moreover, the splitting width of Mn 3s is 4.9 eV which is consistent with $MnO_2$ structure.

In similar manner, EDX analysis of the graphene sample exfoliated in the presence of 20 mM $RuCl_3$ shows the formation of $RuO_2$. The atomic concertation ratio of Ru (5.2%) to O (12%) from the XPS analysis also supports the conclusion drawn from EDX data. It is interesting to note that the high resolution C 1s spectra of graphene functionalised with $RuO_2$ shows the absence of any surface oxidation when compared to graphene functionalised with $MnO_2$ or control samples (FIG. 1D). This suggests that $RuO_2$ acts as a protective layer against graphite oxidation during electrochemical exfoliation. Since $RuO_2$ is demonstrably the best electrocatalyst for oxygen evolution, it is likely that water oxidation at $RuO_2$ surface occurs without significant formation of hydroxyl radical that attack carbon surfaces. A similar effect was noted when iridium was used.

Without wishing to be bound by any particular theory, the inventors attribute the lack of oxidation of the graphene to the use of metal cations having metal oxides that are a good electrocatalyst for water oxidation.

Analysis of XPS data for graphene sample that was exfoliated in the presence of 10 mM $Mn(NO_3)_2$ and 10 mM $RuCl_3$ showed that the incorporation of both Ru and Mn oxides (FIG. 1A black solid colour). The atomic concentrations of C, O, Ru and Mn from the survey scan were 65, 19, 7.7 and 8.3% respectively. This indicates that the amount of $RuO_2$ in the composite structure was in a molar ratio to that of $MnO_2$. Powder X-ray diffraction data showed the absence of diffraction patterns that are associated either with $MnO_2$ or $RuO_2$ structures indicating the oxides were highly amorphous structure. At the priority date, the inventors believed that the Mn oxide was $MnO_2$. However, the inventors have since determined the oxidation state of Mn for a graphene sample that was exfoliated in the presence of 10 mM $Mn(NO_3)_2$ and 10 mM $RuCl_3$ from the splitting width of Mn 3S high resolution XPS spectrum. The splitting width gives 5.4 eV, indicating that the Mn oxide structure is actually $Mn_3O_4$.[3] Examination of the bulk chemical composition of the hybrid graphene-oxide structure by EDX gives 6%, 9%, 29.6% and 55.4% of Mn, Ru, O and C respectively. This shows that the chemical structure of the composite oxide is $Mn_3O_4$—$RuO_2$. The EDX composition also suggests the amount of $RuO_2$ in the composite is 50% greater than that of $Mn_3O_4$, although the composition obtained from XPS analysis indicated that the composite structure contained twice the amount of Ru when compared to Mn.

Figure 2:
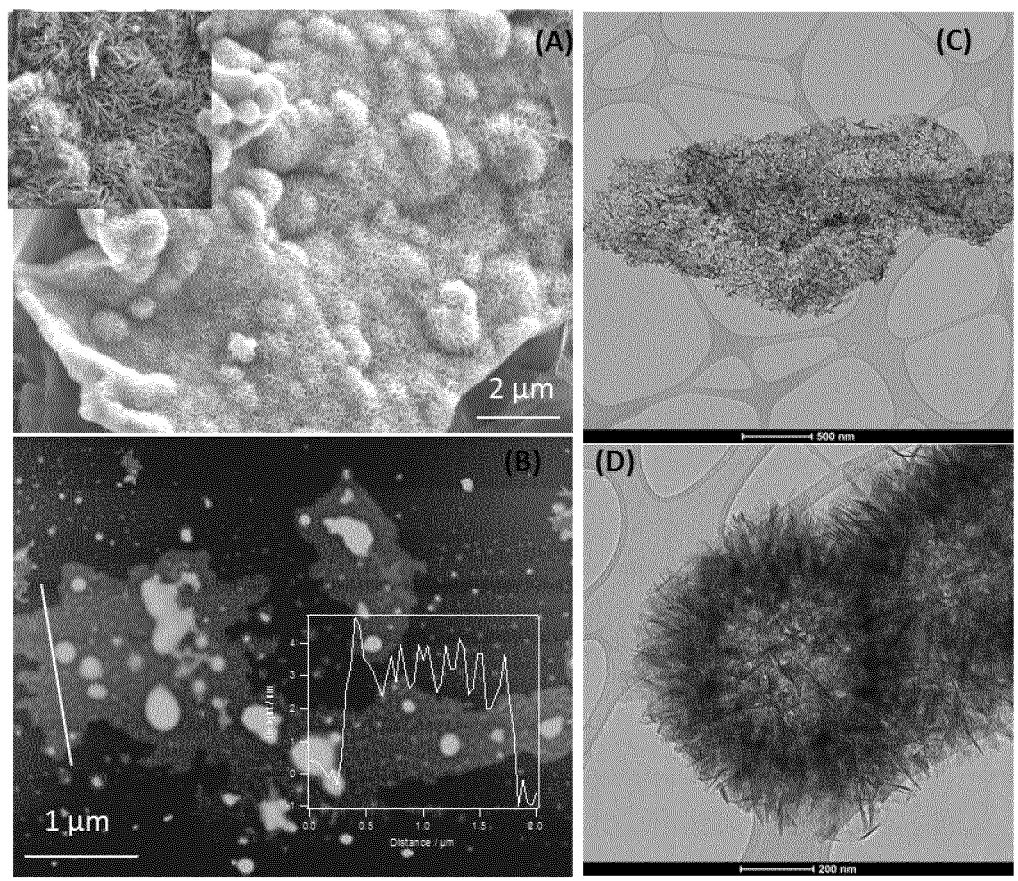
FIG. 2 shows (A) SEM, (B) AFM, (C) and (D) TEM images of $MnO_2$ functionalised graphene sample that were obtained by electrochemical exfoliation of graphite in 20 mM $Mn(NO_3)_2$ in 0.5 M $Na_2SO_4$(aq). The inset in (B) shows height profile for the selected region.

FIG. 2 shows the SEM, AFM and TEM images of graphene samples that were obtained in the presence of 20 mM of $Mn(NO_3)_2$ and 0.5 M of $Na_2SO_4$. The majority of the graphene surface was coated with thin layer of inter-connected honey-comb lamellar like structures (FIG. 2A, 2C-D). AFM showed that the thickness of the lamellar honey-comb $MnO_2$ structure was varies between 1 and 2 nm while that of graphene was also between 1 nm and 2.5 nm (FIG. 2B). In addition, some large hemispherical nanowhisker structures also covered the graphene surface. These large structures were curly flower-like and consisted of petal shaped layers of $MnO_2$.

Figure 3:
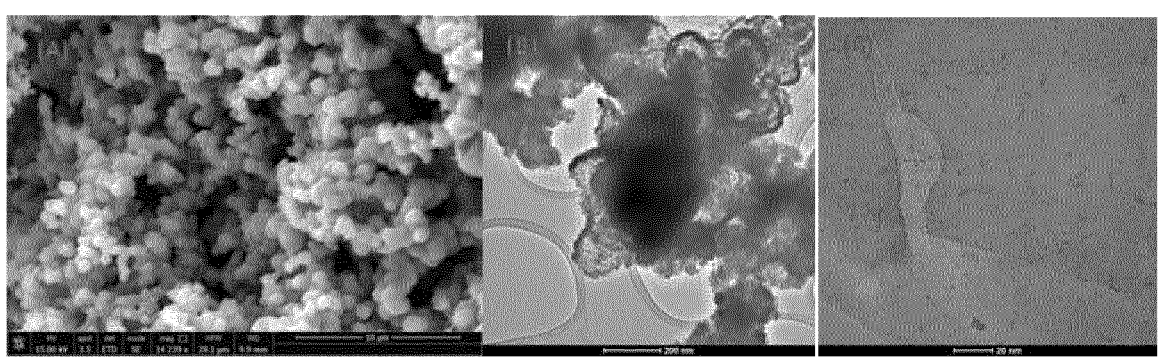
FIG. 3 shows (A) SEM image of $RuO_2$ functionalised graphene (B) and (C) TEM images of $RuO_2$ functionalised graphene. The $RuO_2$ functionalised samples were obtained by electrochemical exfoliation of graphite in 20 mM $RuCl_3$ in 0.5 M $Na_2SO_4$(aq).

By contrast, $RuO_2$ forms individual thick nanoparticles and many of the nanostructures show an aggregation on graphene sheets (FIG. 3A-B). In some places, the $RuO_2$ nanostructures are sparsely distributed over the graphene sheets with an average particle size of ~2 nm (FIG. 3C).

Figure 4:
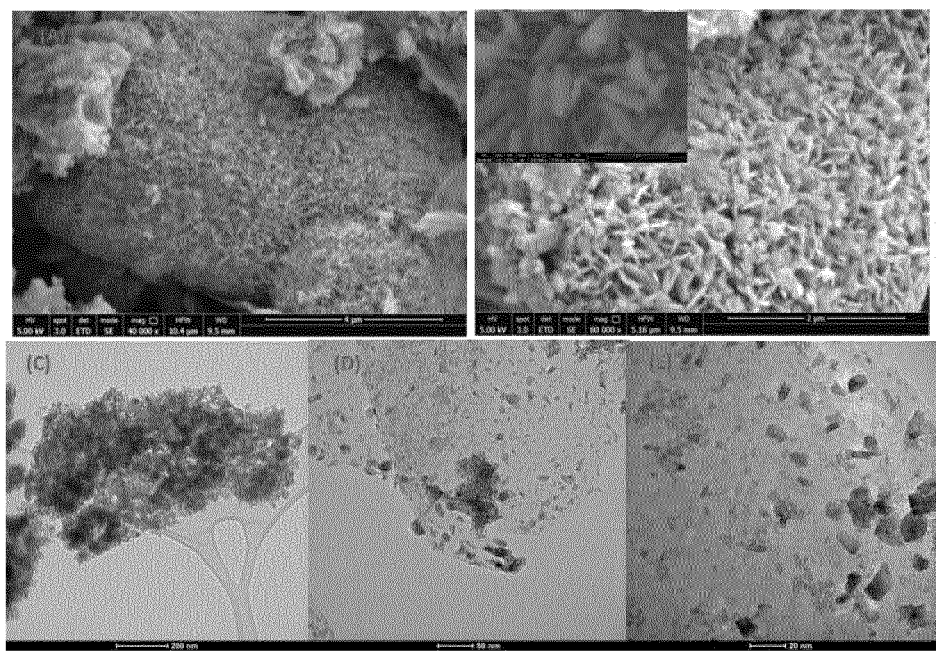
FIG. 4 shows (A) and (B) SEM image of $Mn_3O_4$—$RuO_2$ functionalised graphene (C), (D) and (E) TEM images of $Mn_3O_4$—$RuO_2$ functionalised graphene. The graphene-$Mn_3O_4$—$RuO_2$ functionalised samples were obtained by electrochemical exfoliation of graphite in 10 mM $RuCl_3$ and 10 mM $Mn(NO_3)_2$ in 0.5 M $Na_2SO_4$(aq).

The graphene decorated with a combination of $RuO_2$ and $MnO_2$ showed different morphology to that of the graphene decorated with the individual nanostructures. The SEM and TEM images show that the $RuO_2$ nanoarchitecture grows inside $MnO_2$ honey comb structures with rod and plate-shaped structure (FIG. 4). The average length of the nanorods is 0.5 μm and its diameter is 0.1 μm. EDX mapping indicated that the oxides structures are uniformly distributed across graphene sheets. The local structure, for example the Mn/Ru ratio, may vary depending on location.

Raman spectroscopy showed the formation of functionalised graphene with $MnO_2$ nanostructure. The typical D-band, G-band and 2D-band of graphene was seen along with the Mn—O stretching mode at ~630 $cm^{-1}$. Powder X-ray diffraction (XRD) data showed weak feature besides diffraction peaks from graphitic structure. In the case of $Mn(NO_3)_2$, a set of prominent peaks was found at 37.3, 43.0, and 57.0° which corresponds to (101), (111), (211) plane of β-$MnO_2$ structure. In addition to these peaks, there is broad feature at the lower angle tail of graphite (002) peak. This newly appeared peak corresponds to (002) plane of δ-$MnO_2$ structure. By contrast to $MnO_2$, only broad feature appeared at 34.9° which corresponds to the (101) plane of $RuO_2$ for graphene exfoliated in the presence of $RuCl_3$. For graphene obtained from a mixture of $Mn(NO_3)_2$ and $RuCl_3$, similar diffraction pattern as $RuO_2$ was found, but the most prominent peaks appeared at 36.7°. While the position of the peak is in between $RuO_2$ (101) and β-$MnO_2$ (101) and these structures possess same symmetry (P4$_2$/mnm), this indicates the presence of mixed oxide phase in the sample.

Capacitance of Metal Oxide-Decorated Graphene

Figure 5:
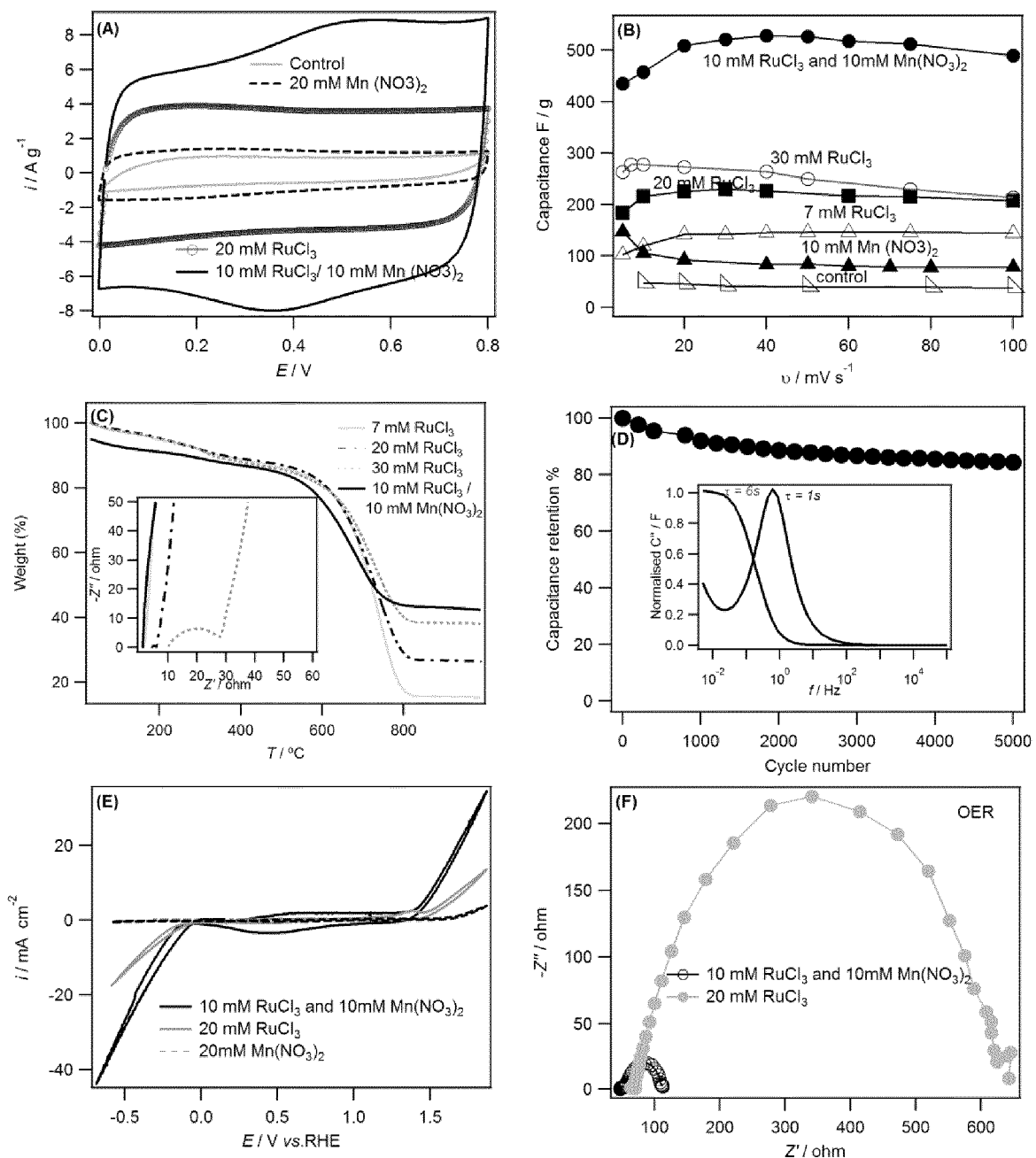
FIG. 5 shows cyclic voltammograms recorded at 20 mV s$^{-1}$ in 1.0 M $H_2SO_4$ (aq) using symmetrical coin cells constructed from indicated electrodes. The voltage was scanned between 0.0 V (initial potential) and 0.8 V, (B) gravimetric capacitance as a function of scan rates at indicated electrodes, (C) TGA traces recorded at indicated samples by ramping the temperature from 40° C. to 1000° C. at a rate of 10° C. min$^{-1}$ in air. The inset shows the Nyquist obtained at open circuit potential. (D) Capacitance retention of G-$Mn_3O_4$—$RuO_2$ electrodes after 5000 cycles in 1.0 M $H_2SO_4$. The inset shows the normalised imaginary capacitance across range of frequencies. (E) RDE polarization curve recorded at 1600 rpm in 0.1 M KOH (aq) at indicated electrodes between −0.7 V and 1.9 V at 10 mV s$^{-1}$ and (F) Nyquist plots obtained at 1.5 V vs RHE. The measurements were carried out at amplitude of 5 mV in the frequency range of 100 mHz to 100 kHz.

The capacitive behaviour of functionalised graphene was assessed using cyclic voltammetry, electrochemical impedance spectroscopy (EIS) and galvanostatic charge-discharge curve and compared to the non-functionalised electrochemically exfoliated graphene (control). FIG. 5A shows the CV obtained at control, graphene functionalised with 20 mM $Mn(NO_3)_2$ (G-$MnO_2$), 20 mM $RuCl_3$ (G-$RuO_2$) and in a mixture of 10 mM $Mn(NO_3)_2$ and 10 mM $RuCl_3$ (G-$MnO_2$/$RuO_2$) in deoxygenated 1.0 M $H_2SO_4$ (aq). The rectangular shape in the CV curve and triangular curve in glavanostatic charge-discharge at graphene-metal oxide composite electrode shows their fast and reversible pseudo-capacitive nature.

As shown, the width of the CV increased considerably as the electrode changed from EEG (electronically exfoliated graphene) to functionalised graphene. The average capacitance of EEG was 40 F $g^{-1}$ and this increased to about 100 F $g^{-1}$ for G-$MnO_2$ and 210 F $g^{-1}$ for G-$RuO_2$ demonstrating the metal oxides contributing to the overall capacitance through their pseudocapacitive behaviour. The capacitance increased with increasing the loading of $RuO_2$ on graphene. TGA showed that the use of 7 mM, 20 mM and 30 mM $RuCl_3$ during exfoliation produced 16%, 27% and 38% of $RuO_2$ loading respectively (weight loss between ~300° C. and 750° C. in the TGA curve was attributed to the decomposition of graphitic carbon).

The corresponding capacitance value almost doubled as the loading of $RuO_2$ increased from 16% to 27% (140 F $g^{-1}$ in 7 mM $RuCl_3$ and 230 F $g^{-1}$ in 20 mM $RuCl_3$). At high loading of $RuO_2$ (38%), its specific capacitance was slightly higher than the 27% loading at lower scan rates but its capacitance becomes the same at high scan rates (v). This demonstrates that 20 mM $RuCl_3$ produces the optimum $RuO_2$ loading for supercapacitor application during simultaneous electrochemical exfoliation and functionalisation of graphene.

The composite sample consisting of graphene, $RuO_2$ and $Mn_3O_4$ (G-$Mn_3O_4$—$RuO_2$) however, showed an extraordinary capacitance of over 520 F $g^{-1}$, about two times the best performing G-RuO$_2$ electrodes. The inventors postulate synergistic effects between the three components, in which graphene probably contributes to the overall enhancement in conductivity of the film while the electrodeposition process might produce high surface area Mn and Ru oxide depositions.

The metal oxides loading of G-Mn$_3$O$_4$—RuO$_2$ (total metal oxide loading was ~42%) is comparable to that of G-RuO$_2$ (30 mM RuCl$_3$). However, the seral resistance of the G-MnO$_2$—RuO$_2$ electrode was lower than the G-RuO$_2$ by more than ten factors (G-Mn$_3$O$_4$—RuO$_2$ was 0.8Ω compared to 4.5Ω for 20 mM RuCl$_3$ and 10Ω for 30 mM RuCl$_3$). The decrease in the internal resistance of the bi-metal oxide is reflected by the decrease in ohmic drop (0.05 V in G-MnO$_2$—RuO$_2$ vs 0.15 V in G-RuO$_2$) in discharge curve obtained at 10 A g$^{-1}$.

Furthermore, the charge transfer resistance at G-Mn$_3$O$_4$—RuO$_2$ was 0.3Ω compared to 17Ω at the electrode obtained using 30 mM RuCl$_3$, which indicates that the redox reactions that contribute to the overall pseudocapacitance is much faster at G-Mn$_3$O$_4$—RuO$_2$. This also the case when analysing the relaxation time constant (τ), a constant which tells the time required to deliver the stored energy and power efficiently. τ may also used to identify the frequency range when the device is dominated by resistive or capacitive behaviour. τ of 1 sec for G-Mn$_3$O$_4$—RuO$_2$ and 6 sec for G-RuO$_2$ electrode was obtained indicating that the resistive loss at G-MnO$_2$—RuO$_2$ is minimal compared to G-RuO$_2$. The synergetic interaction between each component was also more evident when comparing their electrocatalytic activity towards hydrogen and oxygen evolution reactions.

The G-Mn$_3$O$_4$—RuO$_2$ electrode showed a much enhanced catalytic activity for both reactions in alkaline media when compared to G-RuO$_2$ or G-MnO$_2$: the H$_2$ evolution reaction (HER) occurs at −0.06 V and O$_2$ evolution reaction (OER) occurs at 1.37 V. This gives an overall water splitting potential of 1.43 V (which is close to the thermodynamic potential, 1.23 V) by contrast to 1.6 V at G-RuO$_2$. The R$_{CT}$ of OER at G-Mn$_3$O$_4$—RuO$_2$ was also ten times lower than the ROT of G-RuO$_2$ which demonstrates that the kinetics of the OER is much faster at the bi-metal oxide-graphene composite.

Use of the Material as an Electrode
Electrode Preparation

Prior to dispersing the exfoliated product in DMF, the powder was annealed under air at 250° C. for graphene functionalised with MnO$_2$ (G-MnO$_2$) and at 120° C. for graphene functionalised with RuO$_2$ (G-RuO$_2$) for 2 h. The dispersed ink was then filtered over polytetrafluroethylene (PTFE) membrane using a syringe pump dispenser (New Era Pump Systems, Inc, NY) at a rate of 10 mL hr$^{-1}$. The membrane was then dried in vacuum oven at 100° C. for overnight. Coin cell assembly was prepared in standard CR2032 coin cell hardware with symmetrical active materials. The cells were assembled by stacking the two symmetrical membranes back-to-back with the active material contacting the current collector. A few drops of deoxygenated 1 M H$_2$SO$_4$ (aq) were added to fill the electrode before the coin cell was sealed using a hydraulic crimping machine (MSK-160D). The specific capacitance was calculated using the best practice methods established by Stoller and Ruoff.[4]

A three-electrode cell consisting of a 5 mm-diameter glassy carbon (GC) rotating disk working electrode, a saturated calomel reference electrode, and a Pt mesh counter electrode (area of 5 cm$^2$) was used for hydrogen and oxygen evolution reaction measurements. The desired electrocatalyst ink was prepared by sonicating a mixture of 5 mg of the desired powder (G-MnO$_2$, G-RuO$_2$ or G-Mn$_3$O$_4$—RuO$_2$ in 1 mL of N,N'-dimethylformamide and 50 μL of Nafion® (5%, Sigma-Aldrich) for 20 min. The GC electrode was modified by drop coating 10 μL of the above solution, which was then dried at room temperature in air. Polarization curves were obtained while rotating the GC electrode at 1600 rpm at 10 mV s$^{-1}$ using deoxygenated 0.1 M KOH (aq) under N$_2$ atmosphere.

Electrolyte

The charge storage mechanism of ruthenium oxide is based on rapid protonation of the oxide. The successive electron transfer at the metal centres (Ru$^{4+}$, Ru$^{3+}$, Ru$^{2+}$) is balanced by proton transfer for the interconversion of O$_2$ to OH in the oxides. RuO$_2$ generally has much higher capacitance than most high surface area carbon-based electrodes when operating in an aqueous acidic media. However, in the absence of proton source such as in organic electrolytes its capacitance is significantly lower than most carbon-based electrodes. This is due to the inaccessibility of its pseudocapacitance by lack of proton source; and the overall capacitance is only accounted from the electrical double layer. As a result, a supercapacitor device that employs RuO$_2$ as electrode material suffers from low energy density.

The present inventors addressed this problem in their design of a cell using the ruthenium mono- and mixed oxide-decorated materials described here. They did this through design of a protic ionic liquid (PIL) to provide a proton source in the electrolyte. The PIL may be provided in a solvent for use as an electrolyte. It may be used in cells having electrodes comprising RuO$_2$, for example the RuO$_2$ decorated materials of the present invention, and in other cells where proton transfer mechanisms are implicated.

This ionic liquid is diethylmethylammonium bisulfate ([dema][HSO$_4$]). It is formed through proton transfer from a Brønsted acid (diethylmethylamine) to a Brønsted base (sulfuric acid). It is a viscous liquid at room temperature.

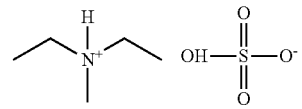

Diethylmethylammonium bisulfate ([dema][HSO$_4$]) may be synthesised using literature methods,[5] in which sulfuric acid were added to diethylmethylamine drop wise (1.05 to 1.0 molar ratio of base to acid respectively). During addition of the acids to bases, the mixtures were stirred under an Ar atmosphere in an ice bath. The resulting colourless viscous liquid was dried at 100° C. under vacuum oven.

Figure 6:
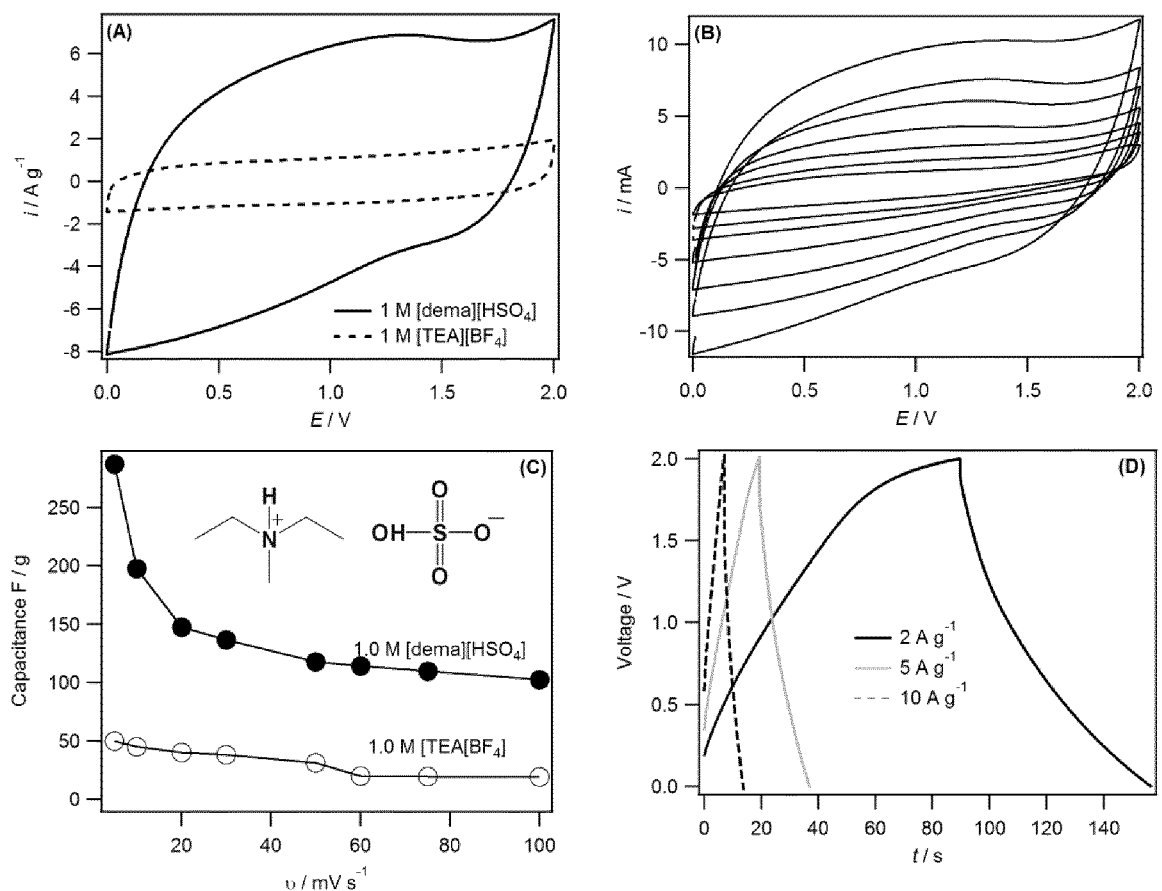
FIG. 6 shows cyclic voltammograms recorded at 20 mV s$^{-1}$ in 1.0 M [dema][HSO$_4$] in acetonitrile (red colour) and 1.0 M [TEA][BF$_4$] in acetonitrile (black colour) using symmetrical coin cells constructed from G-$Mn_3O_4$—$RuO_2$ electrodes. The voltage was scanned between 0.0 V (initial potential) and 2.0 V, (B) CVs recorded at 150, 75, 60, 50, 30, 20, 10 mV s−1 (from top to bottom) in 1.0 M [dema][HSO$_4$] in acetonitrile at G-Mn$_3$O$_4$—RuO$_2$ electrode. (C) gravimetric capacitance as a function of scan rates at indicated electrodes and (D) Charge-discharge curves obtained at G-Mn$_3$O$_4$—RuO$_2$ in 1.0 M [dema][HSO$_4$] in acetonitrile.

Note that this PIL structure contains protons on both the cation and anion so that the pseudocapacitance of RuO$_2$ can be accessible at negative and positive electrodes during charge-discharge process. This PIL was dissolved in acetonitrile (1.0 M concentration) and used as electrolyte in a cell having G-MnO$_2$—RuO$_2$ symmetrical electrodes. The capacitance was compared to 1.0 M [TEA][BF$_4$] in acetonitrile (FIG. 6). The current measured using the electrolyte containing [dema][HSO$_4$] was significantly higher than the current measured using [TEA][BF$_4$] at the same υ indicating that the PIL is providing H$^+$ for the metal oxide's redox reaction.

This resulted in a specific capacitance which is five times (287 F g$^{-1}$ at 5 mV s$^{-1}$) higher than the capacitance of the electrolyte that do not contain protons ([TEA][BF$_4$]50 F g$^{-1}$ at 5 mV s$^{-1}$). Moreover, the shape of the CV and the charge-discharge curve showed responses that are expected for capacitive behaviour for this novel electrolyte. These data demonstrate that PIL-based electrolytes may be useful as a proton source in metal-oxide electrode-based cells.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

REFERENCES

A number of publications are cited above in order to more fully describe and disclose the invention and the state of the art to which the invention pertains. Full citations for these references are provided below. The entirety of each of these references is incorporated herein.

[1] WO 2015/158711
[2] Parvez, Z. S. Wu, R. J. Li, X. J. Liu, R. Graf, X. L. Feng, K. Mullen, Exfoliation of Graphite into Graphene in Aqueous Solutions of Inorganic Salts, J. Am. Chem. Soc. 136(16) (2014) 6083-6091.
[3] Chigane, M.; Ishikawa, M.; Manganese oxide thin film preparation by potentiostatic electrolyses and electrochromism, M. J. Electrochem. Soc. 147(6) (2000), 2246-2251.[4] M. D. Stoller, R. S. Ruoff, Best practice methods for determining an electrode material's performance for ultracapacitors, Energ & Environ Sc. 3(9) (2010) 1294-1301.
[5] Zhang, S. G.; Miran, M. S.; Ikoma, A.; Dokko, K.; Watanabe, M. J. Am. Chem. Soc. 136(5) (2014) 1690-1693.

"One-step Electrochemical Synthesis of Graphene/Metal Particle Nanocomposite" Dizaji et al., 6th Int. Conf. Nanostructures March 2016.

The invention claimed is:
1. A method for the production in an electrochemical cell of metal oxide deposited graphene and/or graphite nanoplatelet structures having a thickness of less than 100 nm, wherein the cell comprises:
    (a) a positive electrode which is graphitic;
    (b) a negative electrode; and
    (c) an electrolyte comprising an intercalating anion and a metal cation, wherein the metal is selected from ruthenium, manganese, iridium, tin, and silver;
    and wherein the method comprises the step of passing a current through the cell to intercalate anions into the graphitic positive electrode so as to exfoliate the graphitic positive electrode and such that the metal ion undergoes electrodeposition in the form of the corresponding metal oxide to produce the metal oxide deposited graphene and/or graphite nanoplatelet structures.
2. The method of claim 1, wherein said metal cation is selected from ruthenium, manganese and iridium.
3. The method of claim 1, wherein more than one metal cation is used so as to produce mixed-metal oxide deposited graphene and/or graphite nanoplatelet structures.
4. The method of claim 3, wherein ruthenium and manganese are used.
5. The method of claim 1, wherein the intercalating anion is sulfate.
6. The method of claim 1, wherein the metal oxide deposited graphene and/or graphite nanoplatelet structures having a thickness of less than 100 nm is substantially free of graphene oxide.
7. A composition comprising graphene and/or graphite nanoplatelet structures, wherein said graphene and/or graphite nanoplatelet structures have metal oxide nanostructures deposited on the basal surface; wherein the metal oxide deposited graphene and/or graphite nanoplatelet structures having a thickness of less than 100 nm is substantially free of graphene oxide.
8. The composition of claim 7, wherein the metal oxide is selected from ruthenium oxide, manganese oxide, iridium oxide, tin oxide, and silver oxide.
9. The composition of claim 7, wherein the metal oxide is selected from ruthenium oxide, manganese oxide and iridium oxide.
10. The composition of claim 8, wherein more than one metal oxide is deposited.
11. A supercapacitor having an electrode comprising a composition according to claim 7.
12. The supercapacitor of claim 11, wherein the electrode comprises metal oxide deposited graphene and/or graphite nanoplatelet structures having a thickness of less than 100 nm, wherein the metal oxide comprises ruthenium oxide.
13. The supercapacitor of claim 12, wherein the electrode comprises metal oxide deposited graphene and/or graphite nanoplatelet structures having a thickness of less than 100 nm, wherein the metal oxide comprises ruthenium oxide and manganese oxide.

14. The supercapacitor of claim 12, wherein the cell has an electrolyte comprising diethylmethylammonium bisulfate.

\* \* \* \* \*